UNITED STATES PATENT OFFICE.

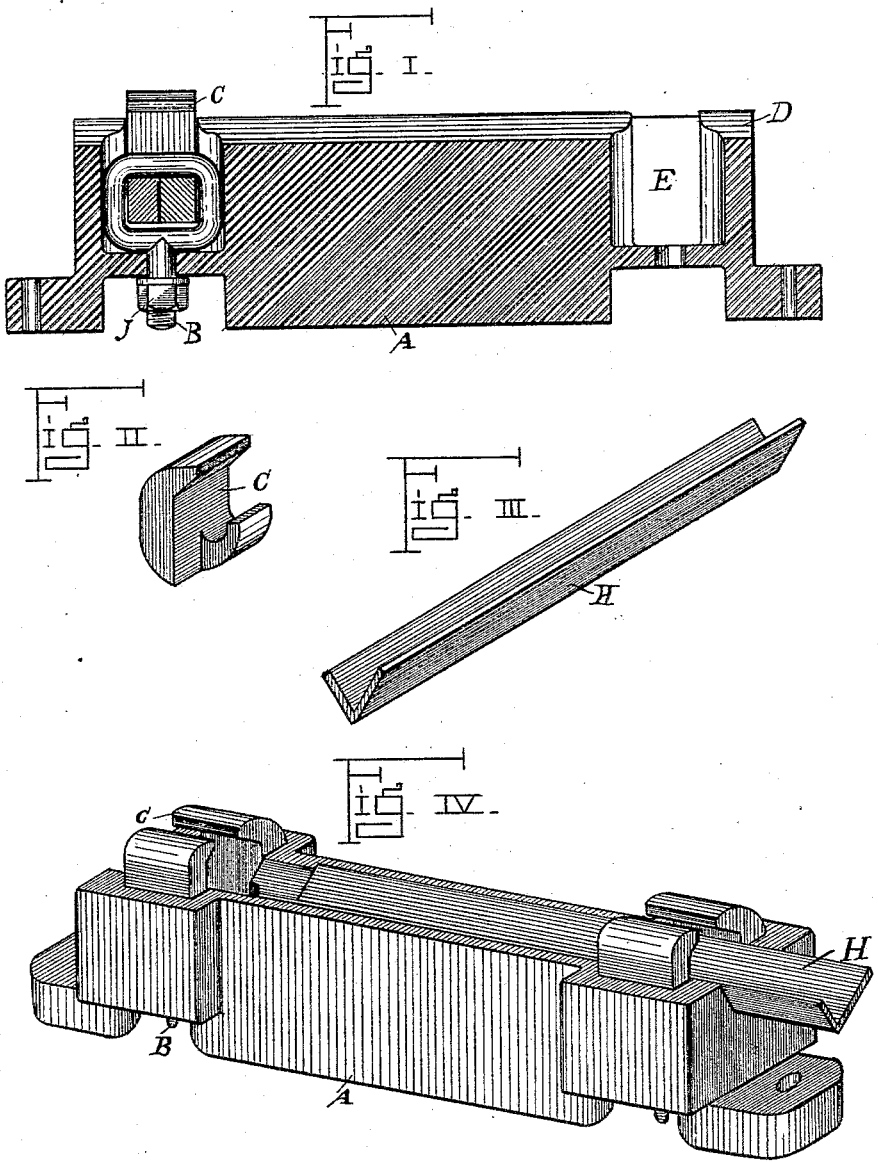

WINFIELD S. ROGERS, OF CINCINNATI, OHIO, ASSIGNOR TO THE UNIVERSAL RADIAL DRILL COMPANY, OF SAME PLACE.

SHAFTING-CHUCK.

SPECIFICATION forming part of Letters Patent No. 411,731, dated September 24, 1889.

Application filed February 5, 1889. Serial No. 298,722. (No model.)

*To all whom it may concern:*

Be it known that I, WINFIELD S. ROGERS, a citizen of the United States, and a resident of Cincinnati, in the county of Hamilton and State of Ohio, have invented certain new and useful Improvements in Shafting-Chucks, of which the following is a specification.

This invention pertains to chucks for holding shafting, cylinders, or cubes while being key-seated or splined upon a planer or milling-machine.

My invention will be readily understood from the following description, taken in connection with the accompanying drawings, in which—

Figure 1 is a vertical section with one set of jaws removed. Fig. 2 is one of the jaws. Fig. 3 is the V-shaped slide, and Fig. 4 is a perspective view of a chuck complete.

In the drawings, A indicates the body or frame, having suitable recesses at proper intervals, as shown.

B represents eyebolts or yokes; C, the jaws. There are two jaws, each the counterpart of the other, and each is provided with a hook-shank on one side, over which hooks engage the loop of the eyebolt.

D is a V-shaped slot in the top of A, running lengthwise.

E is a recess in A for holding jaws C and yoke or eyebolt B.

H is a V-shaped slide to rest in slot D when doing small work and removable for large pieces.

J is a nut tapping on the shank of the eyebolt B.

In operation the chuck is placed on the table of a planer or milling-machine and made fast. The shaft or cylinder to be key-seated or splined is pushed through on the V's D or H and under the jaws C, which are drawn down by the eyebolt B, which engages the hook of the jaws, so that nut J regulates the clamping of the article to be worked, the piece of shafting being thus always drawn down centrally with the tool and rigidly clamped.

Having described my invention, what I claim is—

1. In shafting chucks or vises, the combination, substantially as set forth, of a frame or body having a V-slot in the top part and having suitable recesses at proper intervals, clamping-jaws, and fastening devices engaging said jaws by which the article may be clamped upon the shaft, as shown.

2. In shafting chucks or vises, the combination, substantially as set forth, of a frame or body having a V-slot on the top part and carrying a loose V-shaped slide and having suitable recesses at proper intervals, clamping-jaws, and fastening devices engaging said jaws to draw downward and clamp the article to be worked, as shown.

In testimony whereof I have hereunto set my hand.

WINFIELD S. ROGERS.

Witnesses:
EDWARD BOYD,
T. SIMMONS.